(No Model.)
N. PETERSON.
TWO WHEELED VEHICLE.
No. 279,428. Patented June 12, 1883.
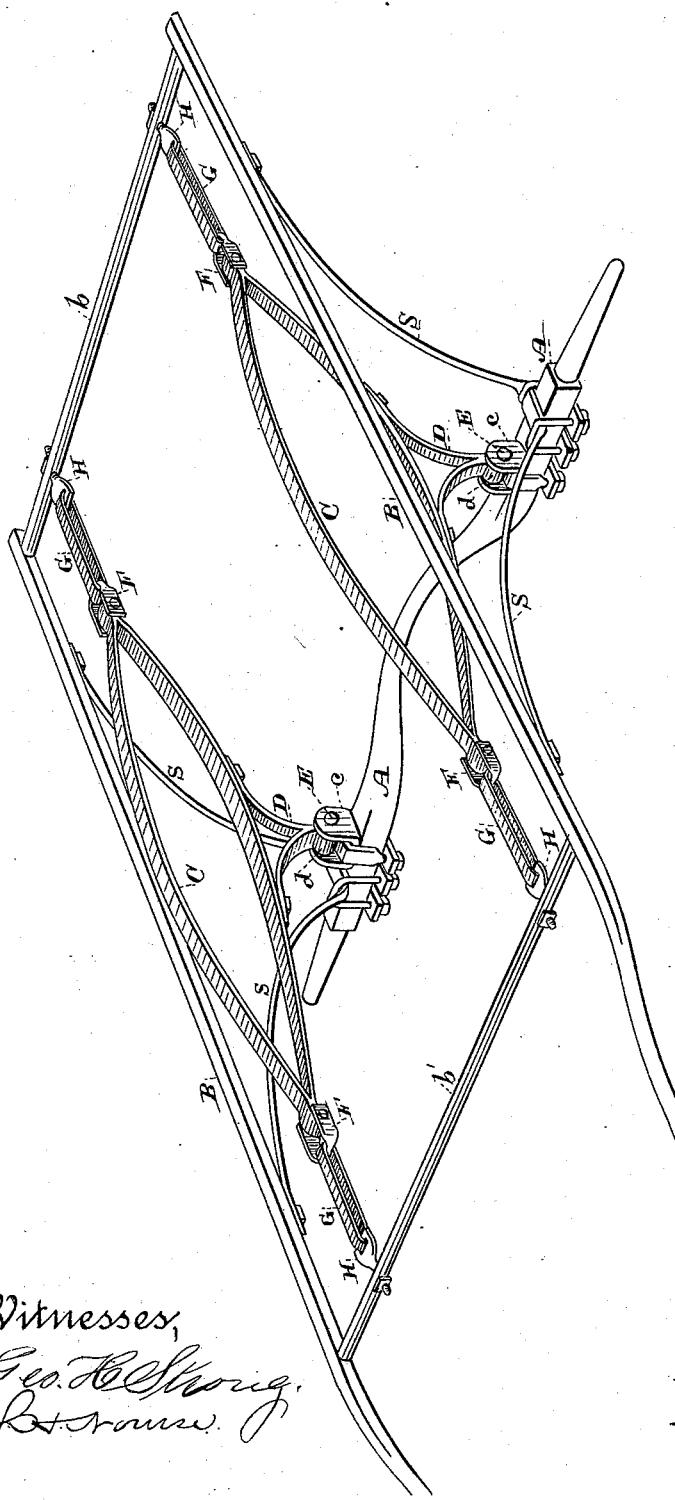
Witnesses,
Geo. H. Strong.
J. H. Krouse.
Inventor
N. Peterson
By
Dewey & Co.
Attorneys

UNITED STATES PATENT OFFICE.

NELSON PETERSON, OF ANTIOCH, CALIFORNIA.

TWO-WHEELED VEHICLE.

SPECIFICATION forming part of Letters Patent No. 279,428, dated June 12, 1883.

Application filed January 22, 1883. (No model.)

*To all whom it may concern:*

Be it known that I, NELSON PETERSON, of Antioch, county of Contra Costa, State of California, have invented an Improved Two-Wheeled Vehicle; and I hereby declare the following to be a full, clear, and exact description thereof.

My invention relates to the class of two-wheeled vehicles commonly known as "carts," and to certain improvements therein, as will hereinafter fully appear.

My invention consists in a hinge-connection between the main body-supporting springs and the axle, and in combination therewith of suitable connections between the ends of the springs and the shafts of their cross-bars.

The object of my invention is to overcome as much as possible the unpleasant jogging motion of the horse, which is usually communicated to the seat, and this object I attain by such a construction as to break the rigid connection between the shafts and axle and the remaining parts of the vehicle.

In the accompanying drawing, to which I now refer, the figure represents a perspective view of my vehicle.

Let A represent the axle of the vehicle, to which the shafts B are rigidly clipped. These shafts do not terminate at the axle, as is usually the case, but extend back and have a cross-bar, *b*, between them. The shafts are raised above the axle by means of a bracket, *s*, which secures them to the axle. The usual cross-bar, *b'*, is secured between them in front.

C represents ordinary elliptical side springs, upon which, by the intervention of any suitable blocks or bars, the body or seat may be supposed to rest. These springs are connected with the axle by a hinge-joint, which I have shown as being constructed in the following manner:

D is a support or bracket, the arms of which are bolted under the springs or otherwise secured, and form below an eye, *d*. Upon the axle, inside of the shafts, is clipped a bent metal piece, forming a bearing, *c*, into which the lower end of the bracket D extends. A bolt, E, passes through the bearing *c* and through the eye *d* of the bracket, and thus forms a pivot or pintle for the hinge-connection. Now, it will be seen that the motion of the shafts, though communicated to the axle to which they are rigidly secured, is not transmitted to the springs and seat, because of the independent or hinge connection of said springs; but it is also obvious that unless some means were adopted to limit the play of the hinge the springs would turn over or fall out of place. To secure them and still preserve their independence I have the following: Pivoted in both ends of the springs are square links F, with which metal straps in the form of endless bands G are connected. The other ends of these bands are connected with the front and rear cross-bars, *b' b*, by means of the tightening-links H, which screw into said bars, and may be tightened up by nuts when desired. These bands will prevent the springs from turning too far on their hinges, and yet allow all necessary play in counteracting the shaft motion. The tightening up of the bands becomes necessary to keep things snug, and also to adjust the springs.

I am aware that heretofore the shafts have been hinged to the axle to accomplish the object I have in view; but that is a different construction, and is not my invention. I deem it important to have a rigid connection between the shafts, to which the draft is applied, and the axle, and this I maintain and still accomplish my object by hinging the springs instead.

Having thus described my invention, what I claim as new, and desire to secure by Letters Patent, is—

1. In a two-wheeled vehicle, the shafts and axle rigidly connected, in combination with the body-supporting springs C, a hinge-connection between said springs and the axle, and a hinge or yielding connection between the ends of said springs and the shafts or cross-bars of said shafts, substantially as and for the purpose herein described.

2. In a two-wheeled vehicle, the shafts and axle rigidly connected, in combination with the body-supporting springs C, the hinge-connection consisting of the bearing *c*, clipped to the axle, and the bracket or support D, secured to the springs and pivoted in the bearing *c*, and connections between the ends of the springs and the shafts or cross-bars thereon to limit the play of the springs, substantially as and for the purpose herein described.

3. In a two-wheeled vehicle, the axle A and shafts B, clipped thereto, said shafts having a front cross-bar, b', and a rear cross-bar, b, in combination with the springs C, hinged to the axle, and the means for connecting the forward and rear ends of the springs with the cross-bars, consisting of the links F H and intervening bands, G, substantially as and for the purpose herein described.

4. In a two-wheeled vehicle, the axle A and shafts B, having cross-bars b b', in combination with springs C, hinged to the axle, the pivoted links F in the ends of the springs, the connecting-bands G, and the screw-links or tighteners H, connecting said bands with the crossbars, substantially as and for the purpose herein described.

In witness whereof I hereunto set my hand.

NELSON PETERSON.

Witnesses:
OLIVER WOLCOTT,
F. LEVINGSTON.